Aug. 30, 1966   R. J. SLATER   3,269,884
FLEXIBLE SHEET SEALING APPARATUS
Filed Sept. 15, 1961   2 Sheets-Sheet 1
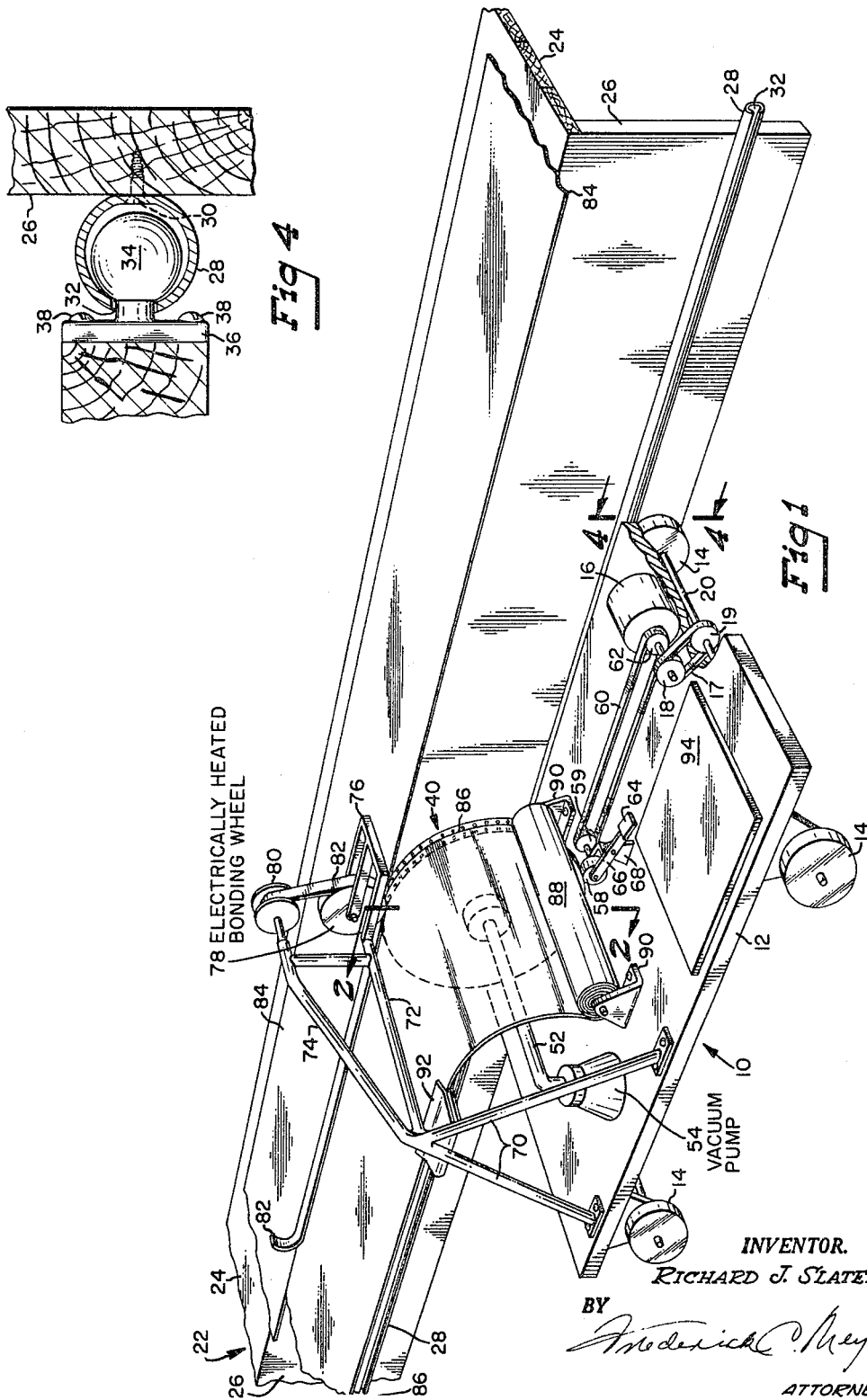
INVENTOR.
RICHARD J. SLATER
BY
Frederick C. Meyer
ATTORNEY

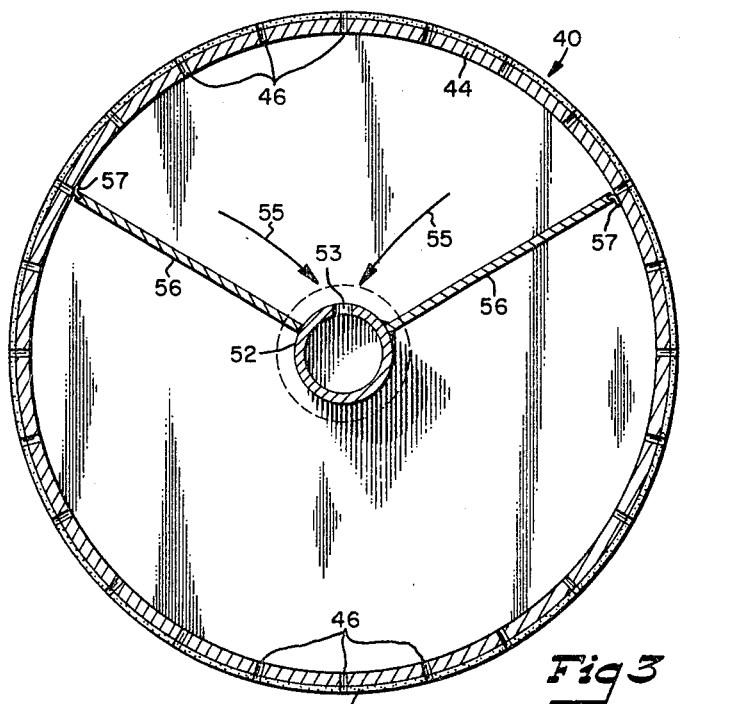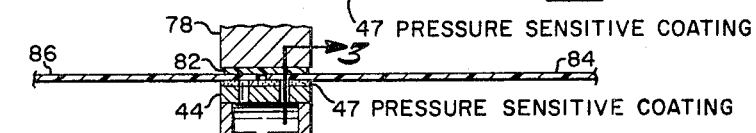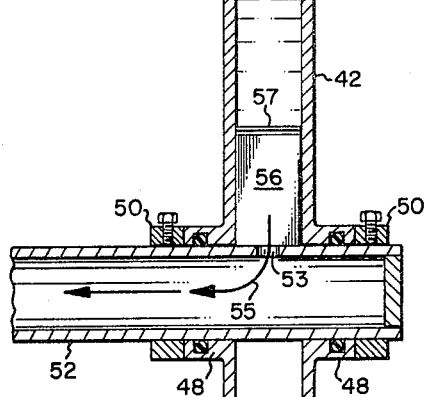

United States Patent Office 3,269,884
Patented August 30, 1966

3,269,884
FLEXIBLE SHEET SEALING APPARATUS
Richard J. Slater, Northfield, Minn., assignor to G. T. Schjeldahl Company, Northfield, Minn., a corporation of Minnesota
Filed Sept. 15, 1961, Ser. No. 138,517
9 Claims. (Cl. 156—545)

This invention relates to the sealing of plastic sheets and more particularly to apparatus for joining together in a heat-sealed relation the marginal edges of large sheet plastic structures, such as the gores of balloons and the like.

In the heat-sealing of large sheets of plastic material, it becomes impractical to utilize a jaw type of sealer since the ponderous character of such a device and the cost of making and maintaining the same outweigh the benefits of instantaneous sealing. Further, the handling of large sheets of material becomes an extremely difficult job where the sheet material is brought to the sealing apparatus. The delicate nature of the plastic in thin structures and the tendency of the plastic material to wrinkle and creep often cause rupturing thereof or misalignment of the material when the sealing jaws are applied. While instantaneous jaw-type sealers are satisfactory and desirable for small sheet structures such as grocery and dry goods bags, the problems are greatly intensified as the sheets to be sealed are of larger area.

It is therefore one object of the present invention to provide apparatus for heat-sealing large plastic sheets wherein the sheets are supported on a fixed surface and the sealer mechanism travels lengthwise of the seam or joint at the same rate that the seal is effected.

Another object of the invention is to provide heat-sealing apparatus capable of assembling units of large bulk, the invention in this regard being particularly suited for the sealing together of an infinite number of balloon gores. Also, the invention has as an additional aim the sealing of gores of infinite length. Actually, the number of gores and the length thereof, when practicing my invention, are restricted only by the capacity of bin, floor space or length of the building in which the assembly is being undertaken.

A further object of the invention is to provide a traveling apparatus for effective seals which has a powered wheel element of a character such as to cause the marginal portions of the sheets that are to be joined together to be temporarily held upon the circumference of the wheel during the joining or sealing procedure.

A still further object of the invention is to provide means for preheating tape and then sealing the same over plastic sheet margins in a continuous manner for the full length of the sheets.

A still further object is to effect a temporary holding of the margins of sheets to be sealed, the holding and sealing being accomplished on either straight or curved edges of plastic sheet or gore material.

According to the embodiment of the invention disclosed herein, two plastic sheets are sealed together by means of a heat sealable tape. To hold the marginal portions of the two sheets to be joined in proper position for the application of the tape, a rotatable wheel is employed which will initially retain the marginal portions of the sheets in abutting adjacency so that the tape can be easily applied. The rotatable wheel in its preferred form includes a number of perforations or apertures in its periphery. By applying a vacuum or negative pressure to the interior of the wheel, the marginal portions of the sheets are temporarily held thereagainst so that the tape can readily be applied. It is also within the purview of the invention to utilize a pressure sensitive coating on the periphery of the wheel. Normally, the pressure sensitive coating would be used in addition to the vacuum action that is employed. The rotatable wheel is carried on a movable platform and the wheel is rotated at a rate so that its peripheral speed corresponds to the rate of advancement of the platform.

These and other objects and advantages of this invention will more fully appear from the following description, made in connection with the accompanying drawings, wherein like reference characters refer to the same or similar parts throughout the several views and in which:

FIGURE 1 is a perspective view of one form my sealing apparatus may assume;

FIGURE 2 is a sectional view taken generally in the direction of line 2—2 of FIGURE 1;

FIGURE 3 is a sectional view taken in the direction of line 3—3 of FIGURE 2; and FIGURE 4 is an enlarged sectional detail view taken in the direction of line 4—4 of FIGURE 1.

Referring in detail to FIGURE 1, the embodiment there exemplifying the invention includes a dolly or carriage 10 having a platform 12. The platform has a plurality of wheels 14 mounted on its underside. The entire dolly or carriage is advanced or propelled along the floor by means of a drive motor 16, which can conveniently be an electrical one although the battery or circuit connections leading thereto have not been depicted. At any rate, the motor 16 causes a belt 17, which is entrained about pulleys 18 and 19, to rotate an axle 20 extending between the front wheels 14.

The dolly or carriage 10 is used in association with a table 22 having a flat top 24 and a vertical side 26. The vertical side 26 in the present instance supports a guide track 28 by means of a plurality of mounting screws 30 located at preferred locations therealong. As best viewed from FIGURE 4, it will be discerned that the guide track 28 is of circular cross section, although other constructions can be utilized. The track 28 as shown, however, is provided with a longitudinal slot 32 so as to retain within the confines of the track 28 an enlarged ball head 34 which serves as a track follower. The head 34 may be integral with a bracket 36 which is attached to one side of the platform 12 through the agency of a pair of mounting screws 38.

Important to a practicing of the invention is a rotatable wheel 40 in the form of a shell. In other words, the wheel 40 is of hollow construction, having sides 42 and a rim 44 extending about its periphery. The rim 44 is formed with a number of perforations or apertures 46, two spaced rows of such apertures being shown in the drawings. Also, it is desirable in a number of situations to have the rim 44 coated with a pressure sensitive material 47 for a purpose hereinafter made manifest. Various commercially available compounds may be employed as the pressure sensitive coating, these materials being generally composed of natural or synthetic rubber containing appropriate modifying ingredients to produce the desired degree of of tackiness. In addition to the foregoing parts constituting the wheel 40, the wheel also has what amounts to a hub 48. At each side of the hub 48 is a thrust collar 50.

The thrust collars 50 encircle a suitable pipe or conduit 52 in the illustrated embodiment and are fixedly attached to this pipe 52. Thus, the collars 50 prevent the wheel 40 from moving axially in either direction. The purpose of the pipe 52 is to provide communication between the interior of the wheel 40 and a vacuum pump 54. Thus, the vacuum pump 54 withdraws air from the wheel 40 through one or more openings 53 in the direction indicated by the arrows 55 in FIGURES 2 and 3.

Actually, as can be readily appreciated, it is not necessary to have the vacuum applied to all of the perforations 46. It has been found that only a peripheral segment of about 120 degrees need have the vacuum feature associated therewith. Accordingly, a pair of angularly disposed vanes or partitions 56 are fixedly anchored to the portion of the pipe 52 within the interior of the wheel 40. As can be easily seen from FIGURE 3, these partitions have a flexible seal 57 engaging the inside surface of the rim 44 so as to prevent unwanted loss of negative pressure.

In order to rotate the wheel 40, a friction drive wheel 58 is employed. The drive wheel 58 is rotated by means of a pulley 59 and a belt 60 extending thereabout, the other end of the belt 60 passing over a pulley 62 rotated by the previously mentioned motor 16. A foot pedal 64 at one end of a pivotal lever 66, which in turn is mounted on an upright standard 68, permits the drive wheel 58 to be brought into engagement with the periphery or rim 44 of the wheel 40. Other means for driving the wheel 40 may be employed, but at this time it should be explained that the peripheral speed of the wheel 40 equals the speed of advancement of the platform 12. Consequently, in the illustrated situation, it may be assumed that the various pulleys 18, 19, 59 and 62, as well as the drive wheel 58, are of a size so as to produce the one-to-one speed correspondence that has been mentioned immediately above.

It will be noted that the platform carries an A-frame which has extending laterally therefrom a lower arm 72 and an upper arm 74. The lower arm 72 has mounted to its free end a bearing bracket 76 on which is journaled an electrically heated bonding wheel 78. The upper arm 74 carries a tape supply reel 80 having a roll of heat sealable tape 82 thereon.

A first sheet of plastic material, such as polyethylene or Mylar, is shown resting on the table top 24. A second sheet 86 of similar material is withdrawn from a supply roll 88 carried on supporting standards 90. For the sake of simplicity, it will be presumed that the sheets 84, 86 are formed with straight edges, although balloon gores usually have curved edges and such edges would be either pre-cut or cut as the sealing progresses. Hence, all that is needed in the illustrated embodiment is a guide 92 which supports and directs the edge of the sheet 86 lying opposite the edge thereof nearer the wheel 40.

It is within the contemplation of the invention to have one or more operators ride the dolly or carriage 10. Accordingly, a mat for such an operator has been designated at 94. It will be recognized that the present invention contemplates the sealing of extremely thin sheets, on the order of one-half mil or so, and it is almost mandatory that the joining together be carried out under personal vigilance. By providing for the transportation of a human operator, continual inspection and manual shifting of the sheets 84, 86 as they pass over the wheel 40 can be achieved. It will be appreciated that the operator is relieved of all steering duties owing to the use of the guide track 28.

Having presented the foregoing information, an operational sequence will now be described. The dolly 10 will be positioned somewhere to the left of the position it appears in FIGURE 1. The flexible sheet 84 will be placed on the table 22 so that a marginal portion thereof will overhang slightly the side 26 of this table in the vicinity of the wheel 40. More precisely, the edge of the sheet 84 should be located at approximately the center of the periphery of the wheel 40 but the proximity of the wheel 40 to the side 26 of the table 22 requires only a very small amount of sheet overhang. Likewise, a marginal portion of the sheet 86 will overlie the other half of the wheel 40.

With the vacuum pump 54 in action, it can be appreciated that little effort will be required by the operator riding on the dolly 10 to locate the marginal portions of the sheets 84, 86 in the overlying relationship that is described above. Stated somewhat differently, the marginal portions are initially retained in a desired degree of adjacency with each other so that the tape 82 that is pulled from the reel 80 and passed under the bonding wheel 78 will be secured in an overlying relationship with the marginal portions.

It should be pointed out at this time that the tape 82 as it is unwound from the reel 80 passes over almost one-half of the periphery or circumference of the bonding wheel 78 before it is actually applied to the marginal portions of the sheets 84, 86. This is of importance, for it permits a preheating of the tape 82. Thus, the tape material is in an appropriately softened condition by the time it reaches the lowermost segment of the bonding wheel 78 so that the weight of the bonding wheel is instrumental in pressing the now tacky tape 82 against the marginal edges of the sheets 84, 86.

As already described, the wheel 40 is driven at a rate of speed so that its rim 44 moves at the same peripheral speed as the platform 12 is moved. Consequently, there is no slippage between the wheels 40 and 78. Also, it will be recognized that the vacuum action supplied by means of the apertures 46 keeps the sheets 84, 86 from shifting to either side. This assures that the tape 82 will overlie to equal degrees the abutting marginal portions of both sheets 84 and 86. This has the decided advantage of maintaining the sheets 84, 86 in a taut, wrinkle-free condition during the tape application step, thereby effecting a strong joining together of the sheets 86, 88, strength being quite important in many instances and particularly in the fabrication of balloons.

It will be recognized that the operator standing on the mat 94 is in a position to watch the marginal portions of the sheets 84, 86 and shift these sheets should their edges tend to vary any appreciable extent from an abutting or substantially mid-center position on the wheel 40. Also, it has already been mentioned that the rim or periphery 44 can have applied thereto a pressure sensitive coating. Such a pressure sensitive coating supplements the action derived from the pump 54. However, it is possible in certain situations to rely exclusively on the pressure sensitive action. Where relatively large sheets are to be joined together, though, it is recommended that the vacuum means be employed and that the pressure sensitive coating be relied upon to augment the action of the vacuum means.

When a pressure sensitive coating is used in conjunction with the periphery or rim 44, it will at times be desirable, depending largely upon the type of pressure sensitive coating and the degree of adherence thereto, to use a positive pressure in the lower portion of the wheel 40. Only a gentle blast of air would be needed to dislodge the joined sheets 84, 86 from their engagement with the rim 44. However, the source of air pressure is not shown, although it is believed obvious that a second pipe 52 could be mounted, say, concentrically within the pipe 52 and that an appropriate outlet into the lower region of the wheel 40 lying between the under sides of the partitions would permit the detachment of the sheets 84, 86 if they should be prone to remaining adhered to the pressure sensitive coating.

From what has been said, it is believed obvious that various sheets 84 and 86 can be joined together, even though only two such sheets are depicted. In this regard, one only has to visualize that the sheet 86 is the new sheet to be added to the sheet 84, it being assumed for the sake of discussion at this time that the sheet 84 has been previously joined to a sheet to the rear thereof on the table 22. In other words, the fact that the dolly 10 travels along one sheet that is held stationary makes it very easy to continually add additional sheets, for only the free marginal edge need be employed for adding on the additional sheets. While the entire length of marginal edge of the sheet 84 in FIGURE 1 has been depicted in an overhanging relation with the table top 24, it will be appreciated that the operator standing on the mat 94 has full control of the situation and that the sheet edge can be pulled into proper position as the dolly moves along the floor while guided by the track 28.

It will, of course, be understood that various changes may be made in the form, details, arrangements and proportions of the parts without departing from the scope of this invention as set forth in the appended claims.

What is claimed:

1. Sealing apparatus for joining together two sheets of flexible material comprising a platform adapted to move relative to a table on which one of said sheets is supported, a wheel element rotatably mounted on said platform having its periphery disposed so as to underlie marginal portions of both of said sheets, means associated with said wheel element for assisting in the initial retention of said marginal portions in adjacency with each other as said wheel passes thereunder, means for rotating said wheel element at a rate such as to produce a peripheral speed corresponding to the rate of advancement of said platform, and sealing means located above said wheel element and movable at the same rate as said platform for joining together said marginal portions while said wheel element is passing thereunder.

2. Sealing apparatus for joining together two sheets of flexible material comprising a stationary support for one of the sheets, a platform member movable relative to said stationary support, a wheel element rotatably mounted on said platform having its periphery disposed so as to underlie marginal portions of both of said sheets to assist in initially retaining said marginal portions in adjacency with each other as said wheel passes thereunder, means for rotating said wheel element at a rate such as to produce a peripheral wheel speed corresponding to the rate of advancement of said platform, and sealing means carried on said platform and disposed at an elevation directly above said wheel element for joining together said marginal portions while said wheel element is passing thereunder.

3. Sealing apparatus in accordance with claim 2 in which said wheel element is provided with a series of apertures in its periphery, and vacuum producing means in communication with said apertures for assisting in the retention of said marginal portions in adjacency.

4. Sealing apparatus in accordance with claim 2 in which said wheel element is provided with a pressure sensitive coating at its periphery for assisting in the retention of said marginal portions in adjacency.

5. Sealing apparatus for joining together two sheets of plastic material comprising a stationary table for supporting one of the sheets, a guide track fixedly disposed with respect to said table, a dolly adapted to be advanced along the floor relative said table, means carried by said dolly slidably engaged with said track for causing said dolly to be guided by said track, a wheel element rotatably mounted on said platform having a perforated periphery, vacuum means connected to said wheel so as to draw air into said wheel via the perforations in its periphery for temporarily holding marginal portions of the sheets to be joined, means for rotating said wheel element at a rate such as to produce a peripheral speed corresponding to the rate of advancement of said dolly, a supply of heat sealable tape, and a heated bonding wheel element carried by said dolly and surmounting said first wheel element for applying said tape to said abutting marginal portions of said sheets while said portions are temporarily held by said first wheel element.

6. Sealing apparatus in accordance with claim 5 in which the periphery of said perforated wheel has a pressure sensitive coating thereon.

7. Sealing apparatus for joining together two sheets of plastic material comprising a stationary table for supporting one of the sheets to be joined, a wheeled dolly for supporting the other of said sheets, a motor on said dolly for propelling said dolly along the floor relative to said table, a wheel element rotatably mounted on said dolly for underlying adjacent marginal portions of both said sheets, vacuum means connected to said wheel element for causing said marginal portions to be drawn against said periphery, means connecting said wheel element to said motor for rotating said wheel at a rate such as to cause the speed of its periphery to equal the speed of said dolly, tape supply means, and means for causing tape from said tape supply means to be applied to said adjacent marginal edges.

8. Sealing means in accordance with claim 7 including a pair of fixed angularly directed vanes for confining the action of said vacuum means to only an upper segment of said wheel element under said tape applying means.

9. Sealing means in accordance with claim 7 including interfitting guide means on said table and dolly for causing said dolly to traverse a predetermined path.

References Cited by the Examiner
UNITED STATES PATENTS

| | | | |
|---|---|---|---|
| 1,012,609 | 12/1911 | Dennis | 156—545 |
| 2,705,693 | 4/1955 | Dildilian | 156—545 |

OTHER REFERENCES

APC 370.059, May 1943, Friz.

EARL M. BERGERT, *Primary Examiner.*

R. I. SMITH, *Assistant Examiner.*